Patented Oct. 8, 1940

2,216,751

UNITED STATES PATENT OFFICE 2,216,751

HEAVY METAL SALTS OF THIOETHER CARBOXYLIC ACIDS

Raphael Rosen, Cranford, N. J., assignor to Standard Oil Development Company, a corporation of Delaware No Drawing. Application May 14, 1935,
Serial No. 21,402

7 Claims. (Cl. 260—435)

This invention relates to a new type of sulfur-containing organic compounds hereinafter referred to as thioether derivatives of organic acids and derivatives thereof.

According to this invention, compounds are prepared having the general formula RS(Z)COOX in which R represents either an alkyl- or aryl group, Z is either $(CH_2)_n$ (in which $n$ is 1 or any number and in which an H may be replaced by an aryl group and in which $(CH_2)_n$ may be either straight or branched) or an aryl group such as $C_6H_4$, and X represents either hydrogen in the case of acids, or a metal in the case of soaps, or an alkyl or aryl group in the case of esters. Oil-soluble compounds are particularly preferred and these are obtained by having R and Z of sufficiently high molecular weight, the number of carbon atoms in the two groups generally totalling 15 or more.

Although it is not desired to limit the invention to any particular method of preparing these compounds, one method of preparing the acids is illustrated by the following reaction:

In other words, a sodium mercaptide is reacted with a halogen acid to form a thioether derivative of organic acid. In a similar manner, other acids may be formed by reactions in which a mercaptide is used having from 1 to 20 or more carbon atoms and in which halogenated fatty acids containing from 2 to 20 or more carbon atoms are used. Aryl groups, such as phenyl, benzyl, naphthyl, etc., may be substituted instead of part or all of the alkyl group in the mercaptide or in the halogenated fatty acid. The proportion of the number of carbon atoms on each side of the sulfur atom may be varied within a wide range, having as low as 1 carbon atom on either side. However, for the sake of oil solubility, the total number of carbon atoms in the hydrocarbon groups on both sides of the sulfur atom must be at least 6 in case both hydrocarbon groups are aliphatic and about 15 in case one of the groups is aromatic. The aliphatic groups may correspond to those obtained from primary normal alcohols, branched chain alcohols or secondary alcohols. Also, instead of aromatic groups, one may use hydrogenated- or alkylated- or hydrogenated-alkylated-aromatic groups. The mineral oil solubility, in general, decreases in the following order: (most soluble) all aliphatic groups, preferably with a total of more than 6 carbon atoms in the aliphatic groups; alkylated hydrogenated aromatics; alkylated aromatics; aromatics. Also, in general, the presence of branched chain groups decreases the viscosity. Any type of halogen may be used in preparing the halogenated acids although chlorine is preferred as the cheapest, and potassium mercaptides may be used instead of sodium mercaptides, if desired.

Merely by way of illustration and not with the intention of limiting the invention, the following specific examples are enumerated:

phenyl thioether of acetic acid,
butyl phenyl thioether of acetic acid,
butyl phenyl thioether derivative of fatty acids derived from the oxidation of paraffin wax,
propyl thioether derivative of fatty acids derived from the oxidation of paraffin wax,
cyclohexyl thioether derivative of acetic acid,
thioether derivative of acetic acid,
bornyl thioether derivative of acetic acid,
benzyl thioether derivative of propionic acid,
amyl thioether derivative of acetic acid,
lauryl thioether derivative of acetic acid,
methyl thioether derivative of stearic acid,
methyl thioether derivative of oleic acid,
secondary hexyl thioether derivative of acetic acid,
b-propyl thioether derivative of propionic acid,
b-propyl thioether derivative of b-methyl propionic acid,
b-propyl thioether derivative of a-methyl propionic acid,
b-thiomethyl ether-b-methyl propionic acid.

The invention includes halogen, sulfur, $NH_2$ and OH derivatives to be used in lubricating oils to improve the load carrying capacity and to act as inhibitors.

The thioether derivatives of organic acids prepared as described above and having the general formula RS(Z)COOH may be reacted with metals, such as cobalt, manganese and lead or derivatives thereof, e. g., salts, to make soaps having good drying properties for use in accelerating the film-forming and hardening of vegetable or other fatty oils, such as linseed oil. For example, it has been found that lead alpha-amyl mercapto stearate, $[C_{16}H_{33}(C_5H_{11}S)CHCOO]_2Pb$, increased the oxygen absorption of linseed oil measured by the pressure decrease in millimeters of mercury) from 30 to 37 in 2 hours and from 122 to 154 in 3¾ hours. The corresponding cobalt and manganese soaps are even better than the lead soap.

These same lead soaps of thioether derivatives of organic acid may advantageously be used in making greases and extreme pressure lubricants, the following formulas being given as two examples of compositions that may be used:

*Extreme pressure lubricant*

| | Per cent |
|---|---|
| Lead a-amyl mercapto stearate | 10 |
| Sulfur | 1 |
| Cylinder oil (110–160 vis.) | 89 |

*Roller bearing grease*

| | Per cent |
|---|---|
| Sodium oleate | 10–15 |
| Lead soaps of thioether derivatives of organic acid | 6–10 |
| Heavy lubricating oil | 75–80 |

If oil-soluble thioether derivatives of organic acids are reacted with metals of the 2nd, 3rd, 4th and 5th groups of the Periodic Table, metallo organic compounds are formed which are suitable for use as oxidation inhibitors and sludge inhibitors for mineral oils such as motor lubricating oils, etc. Specific compounds representative of those which may be used include the following:

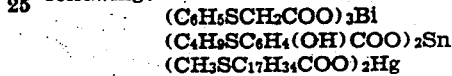

$(C_6H_5SCH_2COO)_3Bi$
$(C_4H_9SC_6H_4(OH)COO)_2Sn$
$(CH_3SC_{17}H_{34}COO)_2Hg$

Instead of preparing compounds having sulfur in the formula $RS(Z)COOX$, the elements selenium and tellurium may be used.

It is not intended that this invention be limited to any of the specific examples given nor to any theories suggested as to the operation of the invention, but in the appending claims it is intended to claim all novelty inherent in the invention as broadly as the prior art permits.

I claim:

1. Oil-soluble ether derivatives of organic acids having the general formula RYZ COOM, in which Y represents one of a group consisting of sulfur, selenium, and tellurium, R and Z represent hydrocarbon radicals containing a total of more than 6 saturated aliphatic group carbon atoms, each of said radicals having a carbon atom attached to Y, and M represents a multivalent heavy base metal which promotes catalytic action in oxidation reactions.

2. Ether derivatives of organic acids having the general formula RYZ COOM, in which Y represents one of a group consisting of sulfur, selenium and tellurium, R and Z represent hydrocarbon radicals containing a total of at least 15 carbon atoms, more than 6 of said total number of carbon atoms being in saturated aliphatic groups and the group R containing a phenyl radical, each of said radicals having a carbon atom attached to Y, and M represents a multivalent heavy base metal which promotes catalytic action in oxidation reactions.

3. Ether derivatives or organic acids having the general formula RYZ COOM, in which Y represents one of the group consisting of sulfur, selenium, and tellurium, R and Z represent hydrocarbon radicals having together a total number of at least 15 carbon atoms and each having a carbon atom attached to Y, R being an aryl radical, Z being a long straight chain fatty acid radical derived from the oxidation of paraffin wax, and M representing a multivalent heavy base metal which promotes catalytic action in oxidation reactions.

4. Compounds according to claim 3, in which M represents a metal of the group consisting of cobalt, manganese, and lead.

5. Ether derivatives of organic acids having the general formula RYZ COOM, in which Y represents one of a group consisting of sulfur, selenium and tellurium, R and Z represent alkyl radicals having a carbon atom attached to Y and having a total number of at least 15 carbon atoms in both radicals, and M represents a metal of the group consisting of cobalt, manganese and lead.

6. Oil-soluble thioether derivatives having the general formula $(RYZ-COO)_nM$, in which Y represents one of the group consisting of sulfur, selenium and tellurium, R and Z are essentially hydrocarbon radicals selected from the group consisting of aliphatic radicals which in R and Z combined have a total of more than 6 carbon atoms, and of mixtures of cyclic radicals with aliphatic radicals, the latter having a total of at least 15 carbon atoms, M represents a multivalent heavy base metal which promotes catalytic action in oxidation reactions, and $n$ is an integer corresponding to the valence of M.

7. Lead alpha (amyl mercapto) stearate.

RAPHAEL ROSEN.

CERTIFICATE OF CORRECTION.

Patent No. 2,216,751. October 8, 1940.

RAPHAEL ROSEN.

It is hereby certified that error appears in the printed specification of the above numbered patent requiring correction as follows: Page 2, second column, line 11, claim 3, for "or" read --of--; line 36, claim 6, in the formula, for "$(RYZ-Coo)_nM$," read --$(RYZ-COO)_nM$,--; and that the said Letters Patent should be read with this correction therein that the same may conform to the record of the case in the Patent Office.

Signed and sealed this 29th day of June, A. D. 1943.

(Seal)

Henry Van Arsdale,
Acting Commissioner of Patents.